United States Patent [19]

Petrovic et al.

[11] Patent Number: 5,064,789
[45] Date of Patent: Nov. 12, 1991

[54] SILICON NITRIDE REINFORCED WITH MOLYBDENUM DISILICIDE

[75] Inventors: John J. Petrovic; Richard E. Honnell, both of Los Alamos, N. Mex.

[73] Assignee: The United States of America as represented by the United States Department of Energy, Washington, D.C.

[21] Appl. No.: 588,874

[22] Filed: Sep. 27, 1990

[51] Int. Cl.⁵ ............................................. C04B 35/58
[52] U.S. Cl. ............................................. 501/97
[58] Field of Search ................................. 501/97

[56] References Cited

U.S. PATENT DOCUMENTS 4,187,116  2/1980  Lange ................... 501/92
4,332,909  6/1982  Nishida et al. ......... 501/92

Primary Examiner—Mark L. Bell
Attorney, Agent, or Firm—Richard J. Cordovano; Paul D. Gaetjens; William R. Moser

[57] ABSTRACT

Compositions of matter comprised of silicon nitride and molybdenum disilicide and methods of making the compositions, where the molybdenum disilicide is present in amounts ranging from about 5 to about 50 vol. %.

3 Claims, 1 Drawing Sheet

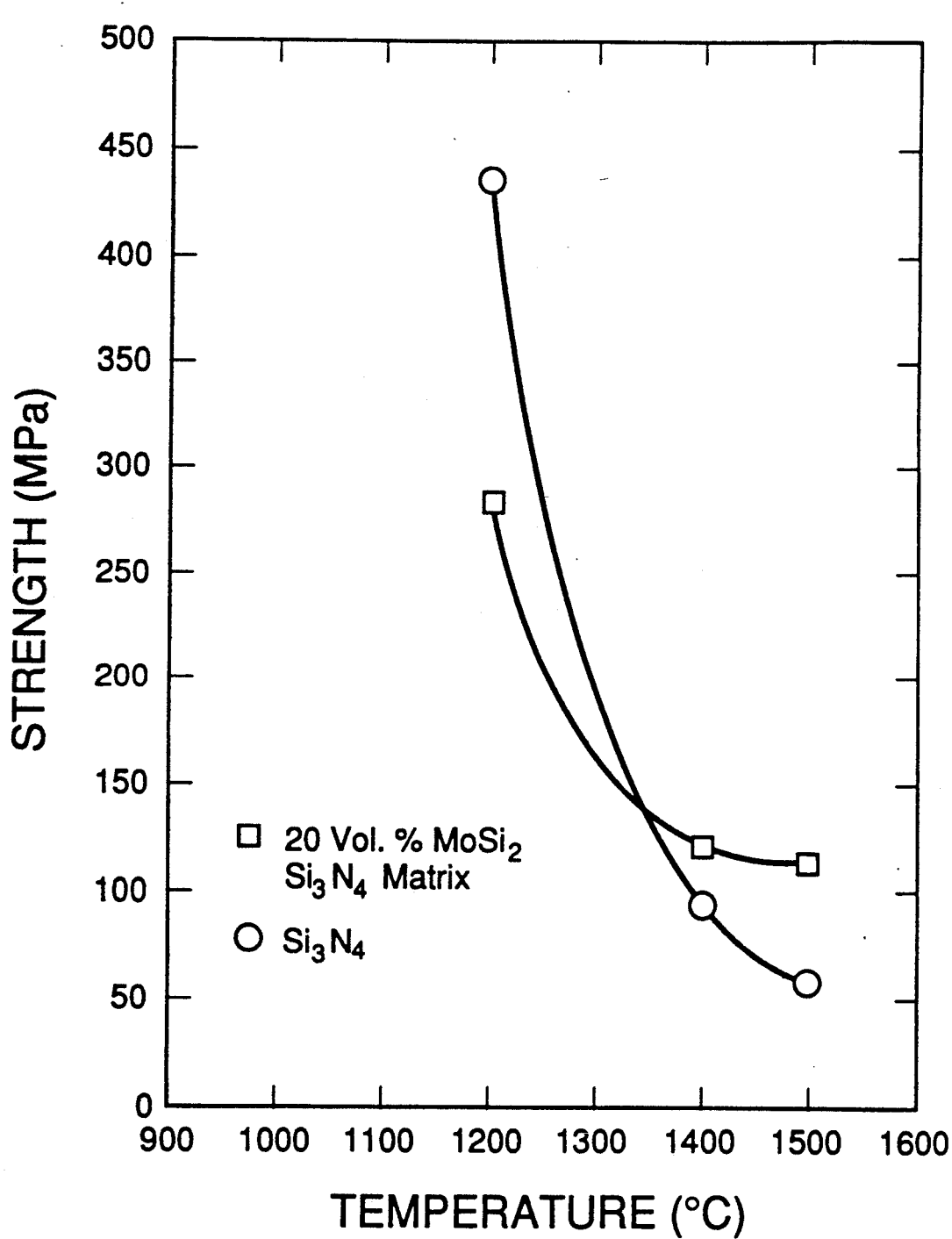

SILICON NITRIDE REINFORCED WITH MOLYBDENUM DISILICIDE

This invention is the result of a contract with the Department of Energy (Contract No. W-7405-ENG-36).

BACKGROUND OF THE INVENTION

This invention relates to the art of materials science and, more particularly, to nonmetallic materials and powder metallurgy.

Ceramic materials have certain outstanding properties, such as high temperature strength, corrosion resistance, low density, and low thermal expansion, which make them attractive materials for high temperature applications. Silicon nitride ($Si_3N_4$) is a ceramic which has a desirable combination of properties for structural use at high temperatures. These are high strength, oxidation resistance, and resistance to thermal shock. However, the fracture toughness (resistance to fracture) of $Si_3N_4$ at both room temperature and elevated temperature is only moderate. Also, it is susceptible to slow crack growth at temperatures above about 1200° C.; when cracks develop, strength is degraded. Slow crack growth also is the cause of $Si_3N_4$ having a relatively short stress rupture lifetime. Monolithic $Si_3N_4$ is currently being tested in a fleet of automobiles as a turbocharger rotor material. Operating temperature is limited to 1000° C., which is an undesirably low temperature for this application. If the deficiencies of $Si_3N_4$ can be overcome, it has the potential to become an important high temperature structural material.

There is a class of materials which offers the advantages of a ceramic and certain of the beneficial mechanical characteristics of a metal. These materials are intermetallics, which at high temperatures have the excellent properties of a ceramic, but also behave mechanically like a metal in that they show yielding and stress-relieving characteristics. Molybdenum disilicide ($MoSi_2$) is an intermetallic compound which has potential for structural use in oxidizing environments at high temperatures. It has a melting point of 2030° C. and its oxidation resistance at high temperatures is excellent, since it forms a protective $SiO_2$ layer. Mechanically, $MoSi_2$ behaves as a metal at high temperatures since it undergoes a brittle-to-ductile transition at about 900–1000° C. Thus, $MoSi_2$ has a stress relieving characteristic at high temperatures. These characteristics of $MoSi_2$ point toward its use in combination with $Si_3N_4$. Reinforcement of $Si_3N_4$ with $MoSi_2$ particles may significantly improve the elevated temperature mechanical properties as compared to pure $Si_3N_4$. It is expected that $Si_3N_4$—$MoSi_2$ composites will possess improved strength, fracture toughness and resistance to crack growth at high temperatures. It is believed that above 1000° C. $MoSi_2$ particles will restrain initiation and propagation of brittle cracks in the ceramic matrix by means of plastic deformation energy absorption mechanisms. Such mechanisms for aluminum metal particles in glass have been shown to improve fracture toughness of the glass composite by a factor of seven. Also, because the $MoSi_2$ particles are a second phase reinforcement, the possibility exists for improvements in low temperature fracture toughness through toughening mechanisms such as crack deflection even though $MoSi_2$ is brittle at room temperature. $MoSi_2$ is thermodynamically stable and chemically stable with $Si_3N_4$ at elevated temperature. Examples of immediate applications for the inventive materials are vehicular engine components such as turbocharger rotors, valves, swirl chambers, rocker arm tips, piston pins, and tappet faces.

Because the room temperature electrical conductivity of $MoSi_2$ is relatively high, it may be possible to use electrodischarge machining of the inventive composites. This method of machining is significantly less expensive than the diamond machining process which is presently used for silicon nitride. Also, though $Si_3N_4$ will not couple to 2.45 GHz microwave radiation at room temperature, it is expected that the inventive composites will do so, so that microwave processing can be used in their manufacture.

SUMMARY OF THE INVENTION

This invention is compositions of matter comprised of silicon nitride and molybdenum disilicide and methods of making the compositions, where the molybdenum disilicide is present in amounts ranging from about 5 to about 50 vol %. A densification aid may be added to the mixture. The strength of a 20 vol % $MoSi_2$ composite is about double that of monolithic $Si_3N_4$ at 1500° C.

BRIEF SUMMARY OF THE DRAWING

The drawing presents strength versus temperature of 20 vol % $MoSi_2$ in an $Si_3N_4$ matrix and monolithic $Si_3N_4$, where both materials contain 5 wt % of a densification aid.

DESCRIPTION OF THE INVENTION

Inventive compositions were made in the following manner. $MoSi_2$ powder of 99.9% purity obtained from Alfa Products of Danvers, Mass. was screened to obtain powder which passed through a 400 mesh screen (opening of approximately 37 microns). The resulting $-400$ mesh $MoSi_2$ powder, $Si_3N_4$ powder, and a densification agent for the $Si_3N_4$ consisting of magnesium oxide were mixed in a high speed mechanical blender in the amounts required to provide the desired composition. The $Si_3N_4$ powder was Grade LC-12 from the German company H. C. Starck.

The mixture was placed, in a Grafoil ® lined die and hot-pressed into disks measuring approximately 31.8 mm in diameter by 6.35 mm thick. Hot pressing was performed in argon and temperatures were measured optically. The pressure applied was about 30 MPa and the specimen in the die was heated to about 1750° C., at which point heating was stopped and a hold period started. Hold time at the peak temperature of about 1750° C. and the peak pressure was about 5 minutes and then slow cooling was started, though it may be desirable to use a longer hold time of up to about eight hours. When the decreasing temperature reached 1200° C., the load was slowly removed and the specimen in the die was allowed to cool to room temperature. A coherent shape was then removed from the die. It is expected that the peak temperatures used in this process will fall within a range of about 1100° to about 2000° C. The pressure applied may be as high as 210 MPa or as low as 1.0 MPa or 0 MPa if pressureless sintering is used.

Composites were prepared which contained 5 wt % of magnesium oxide and 95 wt % of a blend consisting of 20 vol % $MoSi_2$ and 80 vol % $Si_3N_4$. These had a density of 96% of theoretical. Examination of the microstructure showed that the $MoSi_2$ particles were well distributed in the densified $Si_3N_4$ matrix. X-ray diffraction analyses of the composites showed that there was no reaction between the $MoSi_2$ particles and the $Si_3N_4$ matrix, thus indicating that there was thermodynamic stability between these species under the hot pressing conditions. No extraneous reaction phases associated with the MgO densification aid were detected by x-ray diffraction.

Elevated temperature four-point bend tests were performed on the specimens and on specimens of $Si_3N_4$ with 5 wt % MgO which were hot pressed in the same manner as the inventive specimens. Test temperatures were 1200° C., 1400° C., and 1500° C. All testing was performed in air using an Instron mechanical testing unit, a $MoSi_2$ element furnace, SiC loading rams, and a SiC pin-$Si_3N_4$ base bend test fixture. Four-point bend tests are a method for determining the strength of a material in a relatively simple and inexpensive manner. This test utilizes compressive loading, which allows the test to be easily run at high temperatures. Note that strengths of ceramics may vary widely in accordance with the type of test used to determine strength. The test equipment, methods of conducting tests, and the equation used to solve for strength values are known to those skilled in the art.

Test members in the shape of rectangular bars having the dimensions 2.5×5.1×25.4 mm long were diamond machined from the hot pressed disks. The hot pressing direction was parallel to the tensile face of the bend specimen. Two load points on a 5.1 mm wide face of the test member were 9.5 mm apart and the other two load points on the opposite face were 19.0 mm apart. Each of the tests was duplicated several times and the results reported in the Drawing are averages of several tests. The test members were soaked at temperature for about 1/2 hour to allow equilibration. The test members were loaded using a constant strain rate of 0.0508 mm/min.

The Drawing presents strength versus temperature of the specimens which were prepared. Both materials exhibited brittle behavior at 1200° C. in that the specimens fractured before they deformed. At 1400° C. and 1500° C., both materials yielded before fracture occurred and the Drawing shows yield strength. The yield strength shown for 1400° and 1500° C. is that at 0.05 mm plastic offset deviation. At 1200° C., the strength of the composite is lower than that of monolithic $Si_3N_4$, but at the two higher temperatures, the composite is stronger. At 1500° C., the strength of the inventive composites is twice that of the unreinforced material.

Pressureless sintering of a dry blend of materials may also be used to make the inventive compositions; this involves applying only heat to cause the powder to bond together to form a coherent shape. A slip casting step may be added to the process for making the compositions; this step is performed after the dry powders are mixed together. Slip casting to form a green body and then treating it by means of a size reduction process is often done to provide a more homogenous material or a material which is better adapted for hot pressing than a dry mixture of the components. This step would be performed as follows. An aqueous slip suspension containing the blended powders and having a solids loading of about 50 weight percent will be prepared. The amount of solids is not critical, but it is expected that solids loading from about 40% to about 65 wt % will be preferred. Deionized water having a pH adjusted to 9.5 with ammonium hydroxide will be used to make the slip. The pH value and the adjusting agent used are not expected to be critical. The suspension will be mechanically stirred and ultrasonified to keep the constituents from settling before casting is accomplished. The slip will be cast into a plaster of paris mold and allowed to set. The green slip cast body will be dried and then comminuted to −10 mesh (less than 2 mm) shards to yield a material suitable for hot pressing, that is, a material of particle size which will fit into and fill the die. Of course each shard, or large particle, will be substantially homogenous as a result of mixing both the starting dry materials and the suspension.

Other compounds which are known to those skilled in the art may be used as densification aids. The amount of a densification aid which is used may vary from about 0.5 to about 10 wt % of the mixture. Also, it may be desirable to obtain a relatively light composite by omitting the densification aid from the inventive compositions.

A composition of the present invention comprised of equal amounts of $Si_3N_4$ and $MoSi_2$ is known as a cermet. It may be advantageous to prepare compositions comprised of $MoSi_2$ reinforced with $Si_3N_4$ in amounts of about 10 vol % $Si_3N_4$ or more up to the 50/50 mixture claimed herein. It is expected that $MoSi_2$ reinforced with $Si_3N_4$ particles will have useful high temperature properties.

What is claimed is:

1. A composition of matter consisting of a mixture of silicon nitride and molybdenum disilicide, and up to about 10 weight percent of the mixture of silicon nitride and molybdenum disilicide of a densification aid, where molybdenum disilicide is present in an amount of from about 5 to about 50 volume percent of said mixture.

2. The composition of claim 1 where said densification aid is magnesium oxide.

3. The composition of claim 2 where said magnesium oxide is present in an amount of 5.0 weight percent of the mixture of silicon nitride and molybdenum disilicide.

* * * * *